Sept. 23, 1952     E. O. WILLOUGHBY     2,611,869
AERIAL SYSTEM

Filed May 1, 1945     2 SHEETS—SHEET 1

INVENTOR
ERIC O. WILLOUGHBY
BY R. P. Morris
ATTORNEY

Sept. 23, 1952  E. O. WILLOUGHBY  2,611,869
AERIAL SYSTEM
Filed May 1, 1945  2 SHEETS—SHEET 2
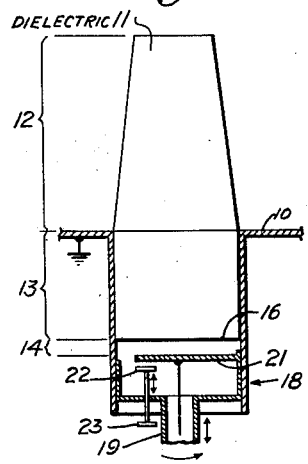
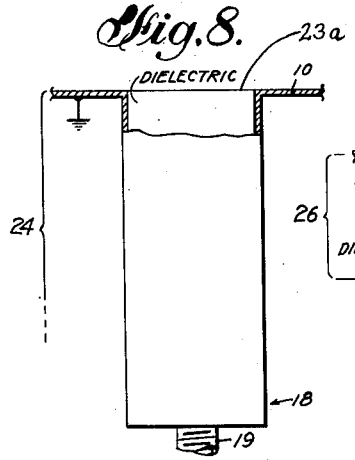
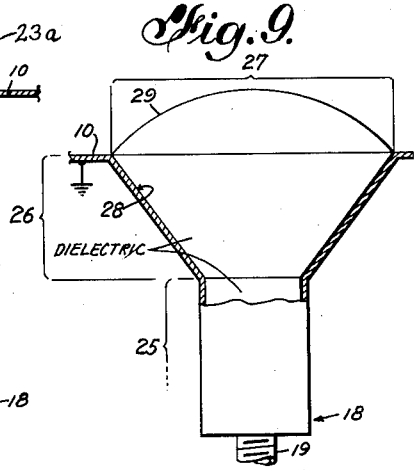
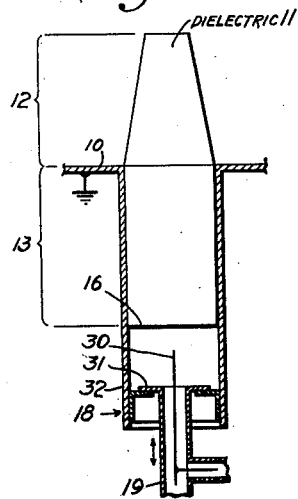
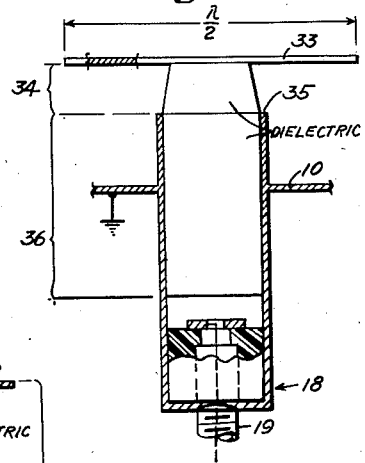
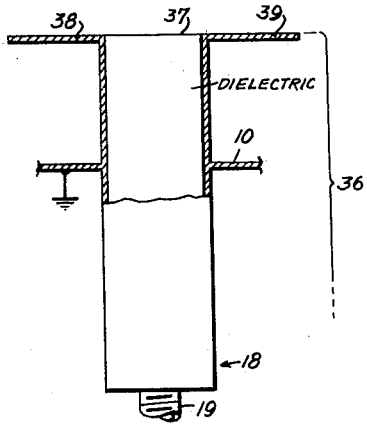
INVENTOR
ERIC O. WILLOUGHBY
BY  R P Morris
ATTORNEY Patented Sept. 23, 1952

2,611,869

UNITED STATES PATENT OFFICE 2,611,869

AERIAL SYSTEM

Eric Osborne Willoughby, London, England, assignor, by mesne assignments, to International Standard Electric Corporation, New York, N. Y., a corporation of Delaware Application May 1, 1945, Serial No. 591,269
In Great Britain April 21, 1944

Section 1, Public Law 690, August 8, 1946
Patent expires April 21, 1964

4 Claims. (Cl. 250—33.63)

The present invention relates to aerial systems for use in free space and particularly, though not specifically, for use on aircraft at frequencies of the order of 100 to 150 megacycles, for example for communication purposes. Rod type aerials, for example dipoles, are usually employed, and when designed for wide frequency band operation, may be conical or may be cylindrical having large diameters. Such aerials give rise to excessive drag when the aircraft is in flight, or lack adequate strength for high speed aircraft.

Objects of this invention, are therefore to reduce the size of aerials for use in free space, and when used on an aircraft, to reduce the air drag produced by the aerials when the aircraft is in flight. Another object of the invention is to provide an aerial whose operational characteristics are substantially unaffected by the presence thereon of water, snow, ice or the like. Whilst rod-type or dipole aerials have been specifically mentioned, it will be understood that the invention is not limited to such types of aerials but includes other types of aerials, as will be clear from the following specification.

The originated and reflected wave fronts travelling on a radiating aerial are respectively substantially spherically expanding and contracting waves, and hence if an unbalanced aerial is placed in a hemisphere of dielectric of higher specific inductive capacity than air, hereinafter just referred to as dielectric, with the aerial feed point at the centre of the hemisphere, the phase velocity of the waves will be the velocity in the dielectric, and the aerial in the dielectric will be shorter than in air and the radiation resistance of the aerial will be lowered; but the radiation is affected by the radius of the hemisphere measured in wave lengths in the dielectric medium of the hemisphere and the length of the aerial in a manner described hereinafter. The conditions apply equally well to a balanced aerial in a sphere of dielectric.

From a broad aspect, therefore, the invention comprises an aerial for use in free space located in a dielectric of higher specific inductive capacity, or dielectric constant, than air, and preferably substantially equal to the dielectric constant of water so as to render the presence of rain, water, snow, ice or the like on the aerial of little effect on the radiation of the aerial.

If the dielectric sphere has a radius for the centre of the aerial equal to $$\frac{\gamma}{2}$$

where $\lambda$ is the operating wave length in the dielectric the wave reflected at the interface between dielectric and air reduces the input current and increases the effective aerial base impedance. The resonant aerial is not so short compared to the geometrical resonant length $\lambda/2$ in the dielectric as the resonant aerial in free space or air compared to the $\lambda/2$ aerial in air. On the other hand a sphere having a radius $\lambda/4$ surrounding a quarter wave resonant aerial increases the aerial base current for a given applied voltage as compared to the current and voltage fed to an aerial buried in an infinitely extending dielectric and further reduces the input impedance of the aerial.

Hence although a dielectric sphere of any radius may be used to surround an aerial and vary its properties, in general a dielectric sphere having a radius centred at the aerial input terminals and equal to an integral number of half wave lengths at the operating frequency is more practical and less critical than a dielectric sphere having a radius equal to an odd number of quarter wave-lengths at the operating frequency.

One point of interest in the formation of a wide frequency band aerial, is the use of a dielectric hemisphere surrounding the aerial and having a radius equal to an integral number of dielectric quarter wave lengths, that is wave lengths measured in the dielectric, at the operating frequency, wherein the difference in the radius of the dielectric and the resonant wave length of the aerial is an odd number of quarter wave lengths as measured in the dielectric. A combination of the two such dimensions results in cancellation of some of the base reactance of the aerial and thereby improves the frequency band pass.

So long as a hemisphere of dielectric is present, the wave front at the aerial tip will behave substantially in the manner described, but there is no reason why figures of revolution other than the hemisphere should not surround the aerial and modify its properties; for instance, if an aerial one wave length resonant were base fed and surrounded by a hemisphere of dielectric one wave length in radius the phasing of the upper half of the aerial and the radiation pattern may be modified by loading the top of the hemisphere by a lens shaped protruberance of the dielectric.

The invention will be further explained in conjunction with the accompanying drawings which show, by way of example only, several embodiments of the invention.

In the drawings:

Fig. 7 is an elevational view partly in section of a dielectric aerial system with a different coupling unit;

Fig. 8 is an elevational view partly in section of a radiating aperture type of dielectric aerial system;

Fig. 9 is an elevational view partly in cross section of a horn type of dielectric aerial system;

Fig. 10 is an elevational view partly in section of a dielectric aerial with a coupling device for exciting said aerial with perpendicularly polarized fields;

Fig. 11 is an elevational view partly in cross-section of a system of dielectric aerial with a coupling unit for exciting said aerial; and Fig. 12 is an elevational view partly in cross section of dielectric aerials loaded with conducting antenna.

Figure 1:
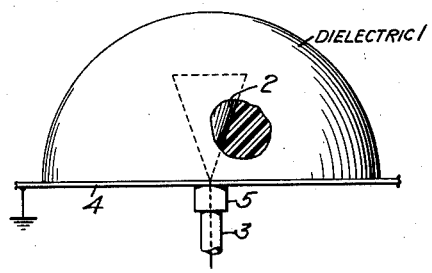
Fig. 1 is an elevational view partly cut away of an unbalanced aerial system using a conical antenna for wide frequency band operation.

In the drawings parts having like functions are given the same designations.

Fig. 1 illustrates an end fed aerial 2 fed by the transmission line 3 and surrounded by a hemisphere 1 of dielectric on the conducting surface or earth plane 4. A plug represented at 5 enables the transmission line 3 to be connected to the aerial 2. Whilst a conical aerial is illustrated in the figure, any other type of aerial may be located in the dielectric hemisphere, for example oval or cylindrical shaped aerials.

Figure 2:
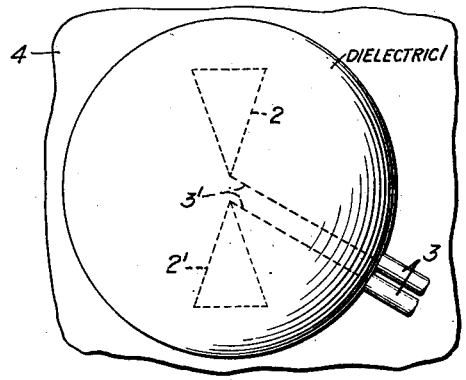
Fig. 2 is a plan view of a balanced aerial system using conical antenna elements.

Fig. 2 indicates a set-up similar to Fig. 1 for a balanced aerial system. It will be observed that the characteristic impedance of the balanced transmission line 3 must be adjusted to be substantially continuous across the surface of the sphere 1 taking into account the presence of the dielectric. Hence the difference shown in physical size of the conductors 3' and 3 inside and outside the sphere 1. If an unbalanced transmission line is used to feed the aerial system, which is usually adopted in cases where a small size aerial is desirable, it is advisable that the quarter wave stub usually provided for suppressing standing waves on the outer conductor of the line is also located inside the dielectric sphere to reduce the size of the stub.

Hence an aerial system enclosed in a dielectric having a dielectric constant of the order of 80 would have its resonant aerial length reduced to practically $\frac{1}{9}$ its length in air. Consider a half-wave end fed aerial operating at 125 megacycles shortened in virtue of its low characteristic impedance to about $$\frac{\lambda}{3}$$

actual physical length in air. This length is decreased in overall length from 0.8 metre long in air to substantially .09 metre long or 9 cms. in such a dielectric hemisphere of 13.3 cms. in radius to form a resonant aerial system. Consideration will show that the wind resistance and strength of the system according to this invention is much more ideal for high speed aircraft than the rod-type aerial supported in air.

It should be pointed out, however, that the radiation resistance measured at the input terminals of the aerial is greatly reduced in the presence of the surrounding dielectric and hence in such cases it is advisable to use the end fed type of half wave resonant aerial both in view of its higher radiation resistance and its flatter frequency response characteristic than the centre fed aerial. By utilising an end fed aerial even in dielectric with dielectric constant substantially $=80$, a base radiation resistance of the order of 10–15 ohms is fairly easily obtained.

In general for broad band operation it is advisable to have a transmission line having a characteristic impedance of this value 10–15 ohms specially made. On the other hand, utilising a normal 70 ohms transmission line, a less satisfactory impedance match between line and aerial can be achieved by means of a quarter wave matching transmission line transformer between the aerial base and the line.

Another type of aerial which can be employed in the present invention with great advantage is a slot aerial, that is a radiating narrow slot approximately one half operating wave-length long, resonating at the operating frequency. One of the difficulties of exciting a slot aerial is the need of having a reflecting plate substantially a quarter wavelength from the slot in the direction opposite to that in which radiation takes place so that when using concentric line feed, the outer conductor does not reactively load one side of the slot. If, however, the slot is formed on the upper surface of a metal screen enclosing a wavelength square of dielectric which is quarter wavelength deep the overall dimensions are reduced. For example, with dielectric of high specific inductive capacity such as eighty, the overall dimensions are reduced to one-ninth of what they otherwise would be in air and at the same time, the depth required for de-coupling the outer concentric conductor of the line is easily provided. For example, for an operating wavelength of 72 centimetres, the slot is formed in the upper plate of a square of said dielectric material 8 cms. x 8 cms. by 2 cms. deep after the manner indicated in Figure 3 transmission line entering at the centre.

Figure 3:
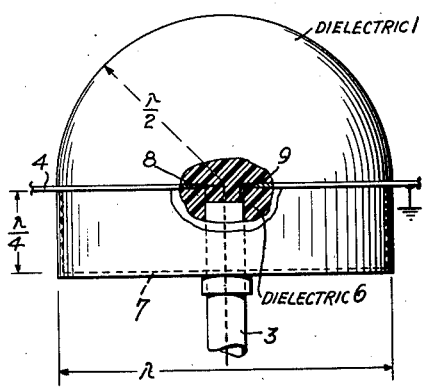
Fig. 3 is an elevational view partly cut away of an aerial system utilizing a slot type of radiating element.
Figure 4:
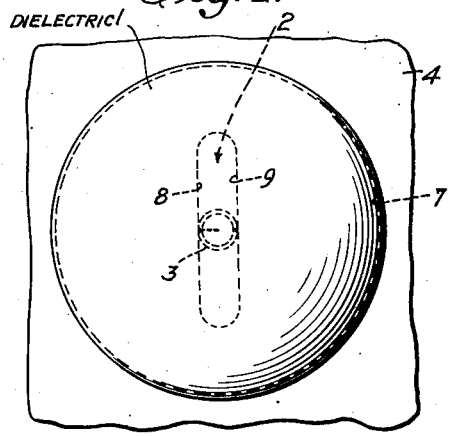
Fig. 4 is a plan view of an aerial system utilizing a slot type of radiating element.

In Figure 3, a piece of said dielectric is indicated at 6 and is surrounded by a metal case 7 supported against an earth plate 4, the aerial slot 2 being half a wavelength long cut through the conducting plate 4 at the centre of the said dielectric piece as indicated in the plan view Figure 4. The central conductor of the transmission line 3 is connected to one side 8 of the slot and the outer conductor is connected to the opposite side 9 of the slot.

Such a slot aerial as described above may be used in two ways, firstly in which the slot is moderately heavily loaded and secondly in which the slot is lightly damped.

Firstly referring to Figure 3, a hemisphere 1 is placed symmetrically above the slot as a radiating element in which to expand the wave front from the slot, and in this case the damping is heavy and the slot is substantially the same resonant length as it would have been in an infinitely extending medium of said dielectric. The slot will then be about one-ninth of the length of the corresponding slot in free space and have a radiation resistance of the order of six to ten ohms across its centre. Secondly, if the hemisphere 1 were omitted, the tuning and radiating of the slot become more complex. To the flux in the air above the earth plate 4, the slot appears as an inductance and to tune it to resonance, therefore, it must be made slightly longer than the resonant length when completely immersed in a medium of dielectric so that the length of slot to the flux in the said dielectric appears capacitive to an extent which tunes out or neutralises the slight inductive flux in the air. The radiation of such a slot then becomes a leakage phenomenon and the slot is of relatively high Q and small damping compared to the case when the slot is surrounded by a dielectric hemisphere.

As described previously for the other types of aerials, the resistance of the slot as affected by the hemisphere of said dielectric, will depend on the radius of this latter allowing for the lower velocity of propagation so that a hemisphere having a radius equal to an even number of quarter wavelengths in the dielectric will tend to increase the effective slot resistance while a hemisphere having a radius equal to an odd number of quarter wavelengths will tend to reduce the slot radiation resistance respectively due to inner and outer face flux reflections from the inner face of the dielectric as viewed at the slot.

Figures 5 to 12 illustrate types of antennae embodying the invention different to the usual rod or dipole type of aerial shown in Figures 1 to 4. The embodiments shown in Figures 5 to 12 utilise wave guides having a dielectric which has a higher specific inductive capacity than air. Thus the critical wave length of the guide is increased. That is, the wave guide filled with the high specific inductive capacity dielectric will propagate waves of smaller frequency than wave guides of the same dimension filled with air. These embodiments now to be described are designed for waves polarised in a plane perpendicular to the length or longitudinal axis or axes of wave propagation, of the guide, and whilst they will be mainly referred to as transmitting aerials it will be understood that they may equally well be employed as receiving or collector aerials, as will be clear to those skilled in the art.

The aerial systems are arranged to radiate circularly polarised waves and this is attained by propagating two component waves polarised at right angles to each other in the plane of polarisation which is perpendicular to the axis of the guide, and differing in phase at the mouth of the guide by 90 degrees.

This 90 degree phase difference may be obtained as follows:

The dimensions of the wave guide in two perpendicular directions may differ by such an amount and the wave guide be of such a length between its exciting and radiating planes that the difference in phase velocity of waves polarised in said directions results in fields polarised in said directions radiated in quadrature phase.

Figure 5:
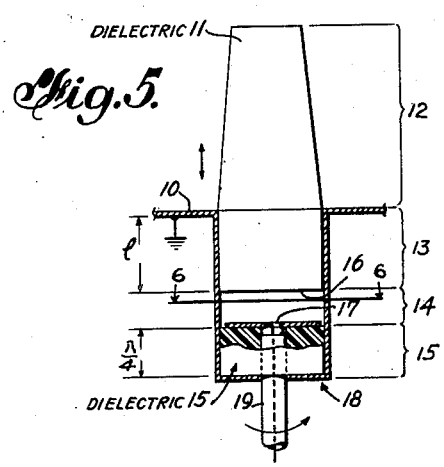
Fig. 5 is an elevational view partly in section of a system of dielectric aerial with coupling unit according to my invention whereby the aerial is excited by perpendicularly polarized fields.
Figure 6:
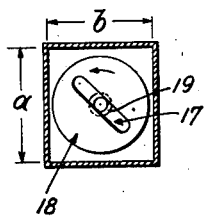
Fig. 6 is a plan view taken along lines 6—6 of Fig. 5.

The angle which the exciting current elements make with these two perpendicular directions of polarisation may be so adjusted that the two fields in quadrature phase will be equal in magnitude and the longitudinal distance between the exciter unit and the input end to the dielectric of the wave guide may be adjusted so as to produce an impedance match between the exciting and radiating units. An arrangement of this kind is shown in Figures 5 and 6. Such an arrangement is simple and its adjustment easy to carry out.

Referring to Figures 5 and 6, reference 11 indicates a piece of dielectric material having a dielectric constant in the order of eighty of rectangular cross-section having different cross-sectional dimensions $a$ and $b$, the unscreened portion 12 of which forms a dielectric aerial and is tapered so that its cross sectional dimensions become less than the critical dimensions of the dielectric wave guide in air. The screened wave guide portion 13 is of length $l$ such that 90° phase difference in the two polarisations is introduced between the ends. $l$ depends upon $a$ and $b$. There is a variable gap 14 between the end 16 of the wave guide portion 13 and the exciting unit 18 comprising in this case, a resonant slot antenna 17 which is fed by a coaxial transmission line 19. By adjusting the gap 14 the degree of coupling between the resonant slot 17 shown in Figure 6 and the end 16 of the wave guide 13 is varied and by rotating the resonant slot 17 the amplitudes of the two perpendicularly related component wave polarisations at the earth plane or conducting plane 10 is adjusted until said amplitudes are equal and the radiation pattern from the radiating portion 11 is circular. The depth of the dielectric 15 in the coupling unit 18 is a quarter wavelength resonant at the operating frequency so as to form a standing wave suppressing stub.

Figure 7 indicates the same radiating aerial system as Figure 5 but showing a different method of excitation. The coupling unit 18 in this case consists of a strip transmission line, i. e. a transmission line formed by the adjacent edges of two parallel strips 21, tuned by the condenser 22 provided with manipulating means 23 and to this transmission line element 21 is connected the centre conductor of coaxial feed transmission line 19. In a similar manner to Figure 5 the coupling is adjusted by moving the whole coupling unit 18 to and away from the end 16 of the screened dielectric wave guide portion 13, and the amplitude ratio of the perpendicularly polarised wave components is altered by rotating this coupling unit 18 about the longitudinal axis.

It will be appreciated in all these cases of the dielectric aerial (Figures 5 to 7) that it is possible to dispense with the dielectric aerial portion 12 and to utilise an aperture 23A as shown in Figure 8, wherein the screened dielectric portion 24 terminates flush with the surface of the conductor plate 10 which forms an earth plane and fills the aperture 23A with dielectric of the wave guide. The wave guide may be connected, for example as described in relation to Figures 5 or 7.

Another alternative arrangement for obtaining the phase difference in the radiated waves perpendicularly polarised is illustrated in Figure 9 wherein 25 represents a wave guide unit producing quadrature radiated fields of 90° phase difference, some small phase change being introduced by the flared portion 26 enlarging the cross section at 27 to a larger radiating aperture 28. Instead of the dielectric being flush at the mouth of the flared portion 26 this aerial can be improved by continuing the dielectric to a convex surface 29 to give when used on an aeroplane, for example, greater response to the reception of waves which leave the ground vertically polarised owing to the more curved wave front resulting.

It will be understood that there are cases where the phase difference need not be 90° between two perpendicularly related exciting units and further that there may be a difference in phase velocity between the two perpendicularly related polarised wave components.

Whilst the simplest radiating system is the open end of the wave guide, for use on an aeroplane the extension of the wave guide dielectric into a dielectric aerial of short length will give not only a better wave guide loading but less aerial screening during banking and tilting of all-metal aircraft and they present far less wind resistance than the usual dipole aerials. Provided the dielectric aerial is short the radiation pattern will be satisfactory in the plane perpendicular to the aerial length. For satisfactory loading of the wave guide the dielectric aerial should be tapered to minimum dimensions much less than the critical dimensions of the dielectric guide for propagation in air.

In connection with the aerial systems of the type illustrated in Figures 5 to 9 a dielectric material having a dielectric constant in the order of eighty is suitable, and dielectric aerials made of such material will greatly minimise the effects of rain and ice as these have practically the same specific inductive capacity as the aerial.

It should be observed that this type of aerial which produces a rotating radiating field will also pick up waves leaving the ground from vertically polarised aerials due to the horizontal components of the radiation therefrom in upward directions, and hence for aircraft work the dielectric aerial is much to be preferred to the horizontal loop type of aerial.

As already stated the dielectric type of aerial is particularly suitable for use at ultra high frequencies, for example, of the order of 300 megacycles upwards and which are fed by wave guides whose dimensions are reduced to practical values by the use of a dielectric having a high specific inductive capacity in the order of 80. Aerials of this type also possess the advantage that the difficulties of connecting the aerial system to an unbalanced transmission line which must be screened, are not present.

In general, the principal types of waves which are preferred are the transverse electric i. e. $TE_{01}$ wave in a rectangular wave guide and the $TE_{11}$ wave in a circular wave guide, each having transverse polarised radiation, and having the smallest critical dimension for the wave guides. If an omni-directional wave polarised in the plane perpendicular to the axis of the aerial is necessary, the $TE_{02}$ or $H_0$ wave in a circular pipe may be used to feed the dielectric aerial 11 or 24 or 25, but with the disadvantage in the latter case that the wave guide transverse dimensions will be increased owing to a much larger critical dimension of circular guides for a given wavelength as compared to the $H_1$ wave.

Figure 10 shows the method of exciting the aerial with an omni-directional vertical polarised radiation. A $TM_{01}$ (transverse magnetic) wave is set up in a circular wave guide or a $TM_{11}$ (transverse magnetic) wave in a rectangular guide. The excitation of these may be carried out in any known manner for example as indicated by Barrow and Chu for rectangular guides, Proceedings of the Institute of Radio Engineers, December 1938, or by Southworth for circular guides in British Patent specification No. 466,063 or in the Bell System Technical Journal, April 1936, page 284. As indicated in Figure 10 an antenna 30 parallel to the wave guide axis is formed as the extension of the central conductor of a coaxial transmission line 19. The coupling between 30 and the dielectric wave guide 13 may be varied by adjusting the distance of 30 from the end 16 of the dielectric 11. The outer conductor of transmission line 19 terminates in a reflecting piston 31 which may be slidably movable within the conducting screen 32 of the wave guide 13.

In the case of Figures 11 and 12 the screened wave guide 36 is continued beyond the conducting plate 10 and a conducting antenna is coupled to the dielectric exposed part which is at some distance from the surface of the conducting plate 10 which may be formed by the wing of an aeroplane for example.

In the case of Figure 11 the antenna is a rod 37 substantially half wave resonant and is supported by the end of the dielectric aerial 34 extending from the end 35 of the wave guide 36 and the coupling between the wave guide and antenna 33 is controlled by the distance of the rod 33 from the end of the screened wave guide portion 36. The wave guide is shown excited by the excitation device illustrated in Fig. 5.

In Figure 12 the conducting sheath of the wave guide portion 36 is continued beyond the conducting or earth plane 10 to the end 37 of the dielectric, which end is unscreened. Advantage is taken of the sinusoidal distribution of voltage across the width of a wave guide to couple quarter wave resonant antennae 38 and 39 on to the conducting sheath. So long as the coupling area at these coupling positions is not unduly large, the wave leaving the guide will expand along the fins represented by the dipole elements 38 and 39, and this will form a suitable means of loading the dielectric aerial 36.

The wave guides may be excited in any suitable manner, for example as illustrated in Figure 5 or 7 or 10 or as described in the references hereinbefore cited.

Whilst certain embodiments of the invention have been described by way of example, others falling within the scope of the appended claims will occur to those skilled in the art. For example, other types of aerial than those shown in Figures 1 to 4 may be enclosed in the dielectric of higher dielectric constant than air. Furthermore the block of dielectric of higher dielectric constant than air enclosing the aerial need not of necessity be spherical or hemispherical but may be any shape desired to modify the radiation pattern of the aerial system.

What is claimed is:

1. A radio antenna comprising a rectangular dielectric element having a part of substantially uniform cross section and a radiating portion of decreasing cross section whereby energy of different effective polarizations may be transferred, a metallic shield surrounding said uniform part of said dielectric element, a conducting plate extending from said shield; an exciting unit mounted within said shield and spaced from one end of said uniform part of the dielectric element, and means for adjusting said spacing to provide impedance match between said dielectric element and said exciting unit.

2. A radio antenna comprising a rectangular dielectric element having a part of substantially uniform cross section and a radiating portion of decreasing cross section whereby energy of different effective polarizations may be transferred, a metallic shield surrounding said uniform part of said dielectric element, a half wave dipole mounted on the unshielded end of said dielectric, a conducting plate extending from said shield at a distance down from the upper end of said shield; an exciting unit mounted within said shield and spaced from one end of said uniform part of the dielectric element, comprising a rotatable plate having a radiating slot, means including a coaxial transmission line for exciting said radiating slot, a dielectric standing wave suppressing stub positioned within said shield and below said plate for suppressing standing waves on the outer conductor of said coaxial line; means for adjusting said spacing to provide impedance match between said dielectric element and said exciting unit, and means for adjusting the angular position of said radiating slot relative to said dielectric element to control the magnitude of the energy of the different polarizations.

3. A radio antenna comprising a rectangular dielectric element having a part of substantially uniform cross section and a radiating portion of decreasing cross section whereby energy of different effective polarizations may be transferred, a metallic shield surrounding said uniform part of said dielectric element, a conducting plate connected to said shield and extending outwardly from said shield adjacent the upper end thereof; an exciting unit mounted within said shield and separated from one one of said uniform part of the dielectric element to form a space therebetween, comprising, a coaxial transmission line, an antenna formed by an extension of the central conductor of said coaxial line, said antenna extending partially into said space, and means for adjusting the space between the end of said antenna and said one end of the dielectric element to provide impedance match between said dielectric element and said exciting unit.

4. A radio antenna comprising a rectangular dielectric element having a part of substantially uniform cross section and a radiating portion of decreasing cross section whereby energy of different effective polarizations may be transferred, a metallic shield surrounding said uniform part of said dielectric element, a conducting plate connected to said shield and extending outwardly from said shield adjacent the upper end thereof; an exciting unit mounted within said shield and separated from one end of said uniform part of the dielectric element to form a space therebetween, comprising, a tunable transmission line rotatably mounted within said shield transversely of the axis of said dielectric element, means for adjusting said space to provide impedance match between said dielectric element and said transmission line, and means for rotating said exciting unit to control the magnitude of the energy of the different polarizations.

ERIC OSBORNE WILLOUGHBY.

REFERENCES CITED

The following references are of record in the file of this patent:

UNITED STATES PATENTS

| Number | Name | Date |
| --- | --- | --- |
| 1,990,649 | Ilberg | Feb. 12, 1935 |
| 2,129,711 | Southworth | Sept. 13, 1938 |
| 2,202,380 | Hollman | May 28, 1940 |
| 2,206,923 | Southworth | July 9, 1940 |
| 2,258,953 | Higgins | Oct. 14, 1941 |
| 2,293,112 | Carlson | Aug. 18, 1942 |
| 2,304,540 | Cassen | Dec. 8, 1942 |
| 2,313,046 | Bruce | Mar. 9, 1943 |
| 2,369,808 | Southworth | Feb. 20, 1945 |
| 2,425,336 | Mueller | Aug. 12, 1947 |
| 2,429,640 | Mieher | Oct. 28, 1947 |
| 2,460,401 | Southworth | Feb. 1, 1949 |